Oct. 30, 1923.
A. WARD
1,472,704
PERCOLATOR AND ELECTRIC HEATING ATTACHMENT FOR THE SAME
Filed April 20, 1922 2 Sheets-Sheet 1
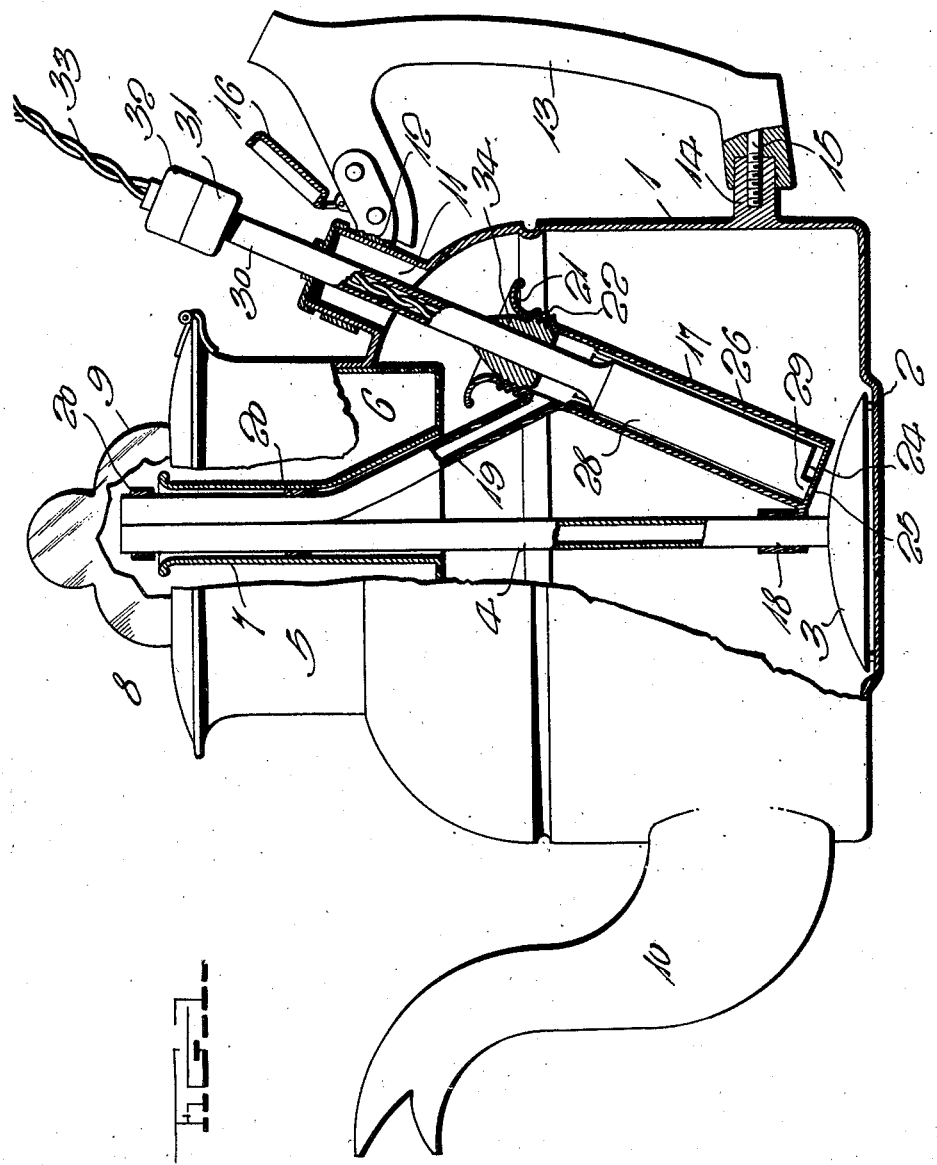
Witness
H. Woodard
Inventor
A. WARD
By H. B. Willson & Co.
Attorneys Oct. 30, 1923.
A. WARD
1,472,704
PERCOLATOR AND ELECTRIC HEATING ATTACHMENT FOR THE SAME
Filed April 20, 1922 2 Sheets-Sheet 2
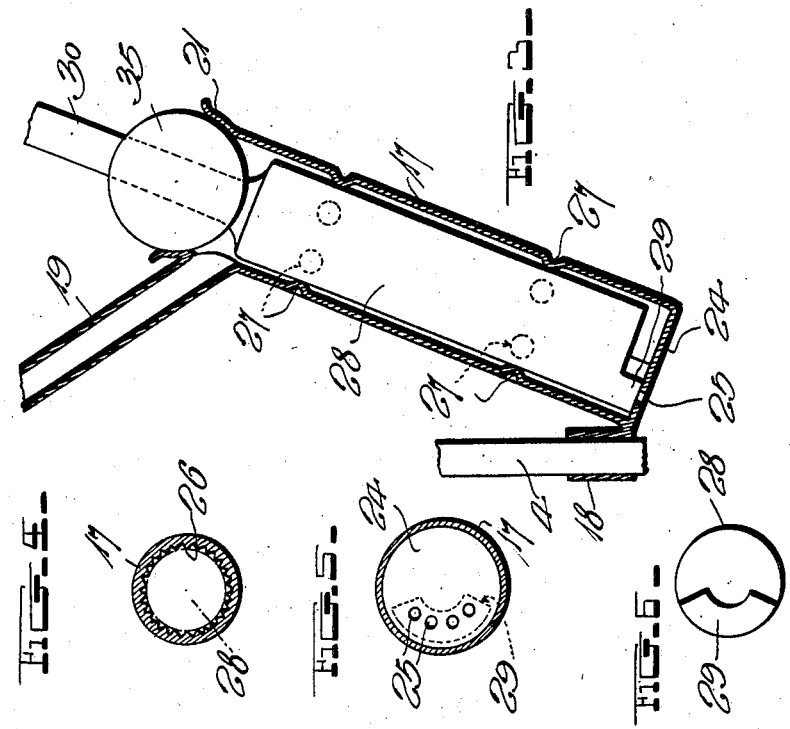
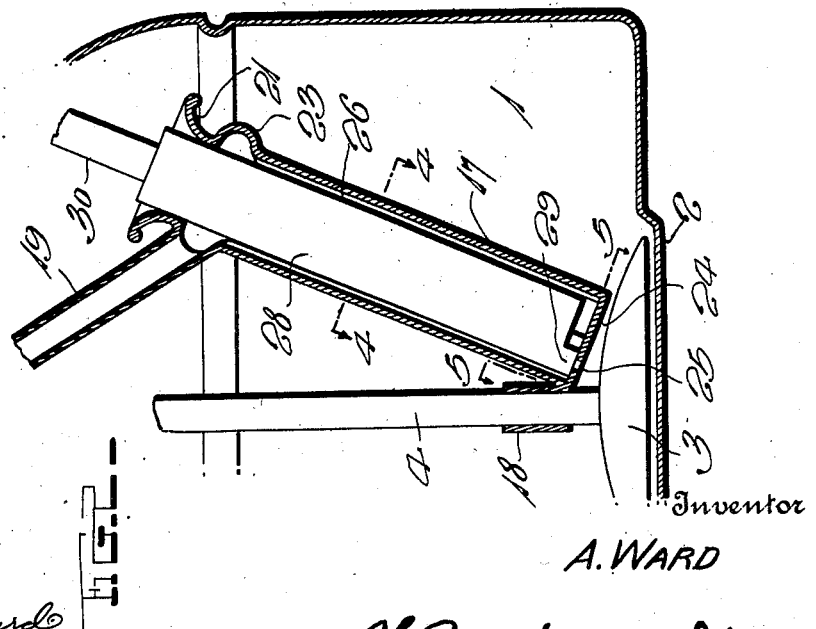
Witness
H. Woodard
Inventor
A. WARD
By H. B. Wilson & Co.
Attorneys Patented Oct. 30, 1923.

1,472,704

UNITED STATES PATENT OFFICE.

ALFRED WARD, OF NORFOLK, VIRGINIA.

PERCOLATOR AND ELECTRIC HEATING ATTACHMENT FOR THE SAME.

Application filed April 20, 1922. Serial No. 555,680.

*To all whom it may concern:*

Be it known that I, ALFRED WARD, a citizen of the United States, residing at Norfolk, in the county of Norfolk and State of Virginia, have invented certain new and useful Improvements in Percolators and Electric Heating Attachments for the Same; and I do declare the following to be a full, clear, and exact description of the invention, such as will enable others skilled in the art to which it appertains to make and use the same.

This invention relates to an improved percolator and one object of the invention is to provide a percolator which is so constructed that it may be used as an ordinary percolator and placed upon a gas stove or other source of applied heat or used as an electrically operated percolator having an electrically operated heating element which is removable from and insertable into the reservoir of the percolator and when in place extended into a heater compartment connected with the lower end portion of the usual percolator tube of the reservoir and having its upper end portion provided with a percolator tube connected with the upper end portion of the percolator tube of the reservoir.

Another object of the invention is to so construct this percolator that when the electrically operated heater is in use, the heater container and percolator tube thereof may be firmly held in engagement with the usual percolator tube of the reservoir and put in place and removed with it.

Another object of the invention is to so construct this percolator that the heater container may be provided with liquid inlet openings in its bottom or lower end, these openings being arranged in an arcuate course and the heating element which is insertable into the heater container being rotatable therein and provided with an extension at its lower end which can be moved into and out of position for covering the inlet opening by turning the heater through the medium of a stem extending through the upper portion of the reservoir.

Another object of the invention is to so construct the heating element and heating container that a portion of the heater element may form a closure for the upper end of the heater container, room being provided within the container so that the liquid which passes into the container through the openings in the lower end thereof may move upwardly about the heater and through the percolator tube which extends from the upper end portion of the heater container.

Another object of the invention is to so construct this percolator that the handle thereof may have its upper end portion connected with a neck of the reservoir through which the heater is inserted and removed, a closure for the neck being carried by a stem extension of the heating element so that the upper end of the neck can be closed when the heater is in use and a closure or cover for the neck being movably mounted adjacent the upper end of the neck so that this neck can be closed when the electric heater is not in use.

Another object of the invention is to so construct this percolator that the parts thereof will be easy to assemble or take apart and easy to clean and so constructed that the electric heating attachment will be very effective in operation when in use.

This invention is illustrated in the accompanying drawings, wherein:

Figure 1 is a view showing the improved percolator partially in side elevation and partially in vertical section.

Figure 2 is a fragmentary view showing a slightly modified form of heater container and heating element.

Figure 3 is a fragmentary sectional view showing a modified form of container and heating element.

Figure 4 is a transverse sectional view taken along the line 4—4 of Fig. 2.

Figure 5 is a sectional view taken along the line 5—5 of Fig. 2 or Fig. 3.

Figure 6 is a bottom plan view of the electrically operated heater.

This improved percolator is provided with a reservoir 1 which is provided with the usual seat 2 to receive the base 3 of the usual percolator tube 4 and is also provided with the usual neck 5 in which will be mounted the coffee pan or cup 6 having a sleeve 7 through which the percolator tube 4 extends. The usual top 8 is provided and this top will include the usual transparent splash-cap or hood 9. A spout 10 is provided for the reservoir and a neck 11 extends from the upper portion of the reservoir adjacent the neck 5 and this neck carries a collar or bracket 12 to which the upper end portion of the handle 13 is secured. The lower end portion of the handle is anchored to a block or arm 14 by means of a removable fastener such as the screw 15. In order to permit the neck 11 to be closed when the electrically operated heating element is not in use, there has been provided a cap or cover 16 which is pivotally connected with the bracket 12 and may be swung to the inoperative position shown in Fig. 1 or may be swung downwardly to close the upper end of this neck 11. It will thus be seen that if it is desired to make use of the percolator in connection with a gas stove or other means of applied heat, the percolator tube 4 can be put in place in the usual manner and the coffee pan then put in place so that the hot water or coffee which will pass up through this tube may pass out through the upper end of the percolator tube 4 and after striking the splash hood or cap 9, drop down and pass through the coffee in the coffee pan and back into the reservoir.

In order to permit the percolator to be heated by an electrically operated heater, there has been provided a heater container or tube 17 which is placed at an angle as shown and is provided at its lower end with a sleeve 18 for fitting upon the percolator tube 4 of the reservoir. A percolator tube 19 extends from the upper end portion of the container 17 and extends at an angle from the container 17 until it contacts with the percolator tube 4, the upper end portion of this tube 19 being extended parallel to the tube 4 and carrying collars 20 which extend about the upper end portion of the percolator tube 4. It will thus be seen that the percolator tube 4 can be passed through the sleeve 18 and collars 20 and will serve to securely but releasably hold the heater container and percolator tube 19 in engagement with the percolator tube 4. The upper end portion of the heater container is flared as shown at 21 so that the heater can be easily inserted. In the preferred form shown in Fig. 1, this tube or container 17 will be provided with a threaded portion 22 above the point where the percolator tube 19 joins the container 17 and in the form shown in Fig. 2, the tube 17 has been pressed outwardly to provide an annular pocket 23 with which the percolator tube 19 communicates. The lower end or bottom 24 of the heater container is provided with a plurality of inlet openings or perforations 25 which are arranged in an arcuate course as shown in Fig. 5. Spacing ribs 26 may be formed to extend longitudinally of the container as shown in Figs. 1, 2 and 4 or if desired in place of the ribs 26, the container may be provided with inwardly extending beads 27 which will serve to hold the heater in spaced relation to the general interior of the container and permit the coffee to pass upwardly around the heater.

The heater has been indicated in general by the numeral 28 and will be provided with a conventional construction for immersion heaters of the electrically operated type. This heater 28 fits into the tubular container 17 and has its lower end portion provided with an arcuate extension 29 which will form a valve element and is intended to rest flat upon the bottom of the container tube and cover the openings 25 when in a normal position. It will thus be seen that this heater will serve not only as a heating device but also as means for covering the openings 25 and will tend to prevent the coffee or hot water in the percolator reservoir from passing into the container through the openings 25. When the heater is rotated by means of the stem 30 which extends outwardly through the neck 11 and terminates in a head or socket 31 for engagement by the socket 32 of the power wires 33, the block or extension 29 may be moved out of position for covering all or a selected number of the openings 25 thus permitting the liquid to pass into the container through the openings which are uncovered. In the preferred form, the stem 30 of this heater is provided with a plug 34 which is threaded to engage the threads 22 of the heater container. It will thus be seen that this plug will serve to close the upper end of the container and it will be further seen that when the heater is rotated to move the block 29 out of closing relation to one or more of the openings 25, this heater will also be moved longitudinally in the container away from the bottom and the liquid will be permitted to pass freely into the container through the uncovered opening or openings. In the form shown in Fig. 2, the body of the heater 28 is somewhat longer than in the form shown in Fig. 1 and will be of sufficient length to extend up into the flared mouth 21 of the container above the annular fluid pocket 23. Therefore, this heater will serve to close the open upper end of the container and the liquid which passes into the container will move upwardly about the heater until it reaches the pocket 23 from which it will pass through the circulator tube 19. In the form shown in Fig. 3, the heater is only slightly longer than the form shown in Fig. 1 and instead of the stem being provided with a threaded plug 34, there has been provided a spherical valve member 35 which will rest upon the flared mouth 21 which in this case will serve as a valve seat against which the valve or ball 35 will rest to prevent the fluid from passing out through the upper end of the container.

When this percolator is in use, the percolator tube 4 of the reservoir will have the heater container and tube 19 connected therewith and the assembled structure will then be inserted through the neck 5 of the reservoir. The coffee pan will then be put in place and the heater inserted through the neck 11 and extended into the heater container. If the form shown in Fig. 1 is in use, it will be rotated to bring the threads of the plug 34 into engagement with the threads 22 of the container and the plug terminals 32 can then be connected with the plug terminal 31. The current can now be turned on and after the heater has been rotated to uncover the desired number of openings 25, the water in the reservoir will pass upwardly through the container 17 and through the percolator tube 19 from which it will be ejected and will drop down and pass through the coffee in the coffee pan. When no longer in use, the parts can be easily taken apart and cleaned and reassembled.

I claim:

1. A percolator comprising a liquid reservoir, an ingredient carrying cup, a removable percolator tube in the reservoir extending upwardly through the cup, a heater container in the reservoir provided with a port for the passage of liquid, a second percolator tube extending from the heater container through the cup, and a heating element extending into the reservoir and positioned within the heater container.

2. The structure of claim 1 having the heater container provided with a liquid inlet in its lower end, the heating element including a portion for closing the upper end of the container when in place.

3. The structure of claim 1 having the heater container provided with a liquid inlet, the heating element being rotatable in the heater container and when turned moving into and out of position for covering the liquid inlet of the container.

4. The structure of claim 1 having the heater container in the form of a tube circular in cross section and having its bottom provided with liquid inlet openings formed in an arcuate course, the heating element being rotatable within the container and having its lower end provided with an arcuate extension moving into and out of position for covering the fluid inlets as the heating element is rotated.

5. The structure of claim 1 having the heater container in the form of a tube circular in cross section and having its bottom provided with liquid inlet openings formed in an arcuate course, the heating element being rotatable within the container and having its lower end provided with an arcuate extension moving into and out of position for covering the fluid inlets as the heating element is rotated, the heating element having a portion for closing the upper end of the heater container in threaded engagement therewith whereby turning of the heating element will move the same longitudinally of the container towards and away from the perforated bottom of the container.

6. The structure of claim 1 having the heater container and percolator tube thereof connected with the percolator tube of the reservoir and removable with the same through the upper end of the reservoir when the heating element and ingredient cup are removed.

7. The structure of claim 1 having the heater container and percolator tube thereof removably connected with the percolator tube of the reservoir.

8. The structure of claim 1 having the heater container and percolator tube thereof provided with collars slidable onto and off of the percolator tube of the reservoir whereby the heater container and its percolator tube may be slid onto and off of the reservoir percolator tube.

9. The structure of claim 1 having the heating element terminating short of the upper end of the heater container and provided with a stem extending through the upper end of the container and through the upper portion of the reservoir, the stem having a plug element forming a closure for the open upper end of the heater container, and the percolator tube of the container communicating therewith intermediate the plug and upper end of the heater.

10. The structure of claim 1 having the heating element terminating short of the upper end of the heater container and provided with a stem extending through the upper end of the container and through the upper portion of the reservoir, the stem having a plug element forming a closure for the open upper end of the heater container and the percolator tube of the container communicating therewith intermediate the plug and upper end of the heater, said reservoir having a neck for insertion and removal of the heating element, a closure for the neck carried by the heater stem, and means for closing the neck when the heating element is removed.

11. A percolator comprising a liquid reservoir, an ingredient carrying cup, a removable percolator tube in the reservoir extending upwardly through said cup, a heater container in the reservoir, and a heater positioned within said container; said heater container being provided with an inlet and an outlet port, and being slidably mounted on said removable percolator tube at an angle thereto, and a second percolator tube connected to said heater container at the outlet port thereof and extending into the ingredient carrying cup.

In testimony whereof I have hereunto set my hand.

ALFRED WARD.